(12) United States Patent
Hagiwara (10) Patent No.: US 7,656,548 B2
(45) Date of Patent: Feb. 2, 2010

(54) PRINTER AND PRINTING METHOD

(75) Inventor: Takahiro Hagiwara, Chiba (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 843 days.

(21) Appl. No.: 11/223,041

(22) Filed: Sep. 12, 2005

(65) Prior Publication Data
US 2007/0057978 A1    Mar. 15, 2007

(51) Int. Cl.
*G06F 15/00* (2006.01)
*B41J 3/42* (2006.01)
(52) U.S. Cl. .......................... 358/1.15; 400/74
(58) Field of Classification Search ............... 358/1.15, 358/1.14, 1.9, 526, 296, 3.26, 505, 518, 406; 400/74, 240.1, 697.1; 399/39, 301; 235/385, 235/454, 380, 375, 381, 435
See application file for complete search history.

(56) References Cited

U.S. PATENT DOCUMENTS 5,963,641 A * 10/1999 Crandall et al. ................ 380/2
2002/0054347 A1 * 5/2002 Ikeda ........................ 358/1.15

FOREIGN PATENT DOCUMENTS

| JP | 08-063309 A | 3/1996 |
| JP | 11-003193 A | 1/1999 |
| JP | 2001-134405 A | 5/2001 |

* cited by examiner

*Primary Examiner*—Saeid Ebrahimi Dehkordy
(74) *Attorney, Agent, or Firm*—Foley & Lardner LLP (57) ABSTRACT

A program execution unit determines a kind of an error and an error recovery method referring to an error recovery content management table and an error recovery method setting table, which are previously stored in a memory, from a kind of an error detected in a print language analysis step of a RIP. Information that an error occurs is given to user via an information unit so that user selects and prints necessary page of a print job, which is not printed.

17 Claims, 10 Drawing Sheets

| Kind of errors | Recovery method ID |
|---|---|
| Grammer error | 2 |
| Font error (one-byte character) | 1 |
| Font error (two-byte character) | 2 |
| System error | 2 |
| Other error | 3 |

FIG. 7

| Recovery method ID | Recovery content |
|---|---|
| 0 | • Continue print-start job<br>• Continue non-print-start job with usual print<br>• Intactly continue several-paper print, finishing function (staple, punch, etc.)<br>• Give error content information to user, and display and record it as history |
| 1 | • Continue print-start job<br>• Save non-print-start job as electronic data<br>• Intactly continue several-paper print, finishing function (staple, punch, etc.)<br>• Give error content information to user, and display and record it as history |
| 2 | • Stop print-start job, and save print job as electronic data<br>• Save non-print-start job as electronic data<br>• Intactly continue several-paper print, finishing function (staple, punch, etc.)<br>• Give error content information to user, and display and record it as history |
| 3 | • Stop print-start job, and do not save print job as electronic data<br>• Do not save non-print-start job as electronic data<br>• Cancel print job<br>• Give error content and cancel information to user, and display and record it as history |

PRINTER AND PRINTING METHOD

BACKGROUND OF THE INVENTION

1. Field of the Invention

The present invention relates to printer and printing method, which can input data externally to print it.

2. Description of the Related Art

Conventionally, the following method has been disclosed in JPN. PAT. APPLN. KOKAI Publication No. 8-63309. According to the method, printing is interrupted in a printer if the frequency of error commands occurring in print language analysis and the number of blank sheets of paper reach a predetermined threshold. Then, the foregoing error is reported to terminals, and thereafter, printing is stopped or restarted when receiving the instructions suited to the error.

However, the error command described in the Publication No. 8-63309 is not merely included in a language system of the print language used for analysis. The foregoing method can not take suitable courses if the following errors are made in the printer. One is an error of data integrity such as syntax error and illegal character. Another is an error resulting from a shortage of printer resource (e.g., memory and magnetic disk). Moreover, malfunction occurs in the error detection based on the threshold of the number of a blank sheet of papers if the following case is given. Specifically, blank sheets of paper intentionally replenished by user and the number of backside pages inserted automatically in double-side printing are much.

As a result, there is a problem that print output is wastefully made due to the foregoing errors such as illegal character and malfunction.

BRIEF SUMMARY OF THE INVENTION

The object of an aspect of the present invention is to provide printer and printing method, which can prevent wasteful print output when errors such as syntax error, illegal character and a shortage of system resource occur.

According to an aspect of the present invention, there is provided a printer comprising:

an input unit inputting print data;

an analysis unit analyzing data inputted by the input unit; and a controller executing control for changing a content of a print job in accordance with a kind of an error detected by the analysis unit.

According to another aspect of the present invention, there is provided a printing method of a printer comprising:

inputting print data;

analyzing data inputted; and changing a content of a print job in accordance with a kind of an error detected by the analysis.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

DETAILED DESCRIPTION OF THE INVENTION

One embodiment of the present invention will be described below with reference to the accompanying drawings.

Figure 1:
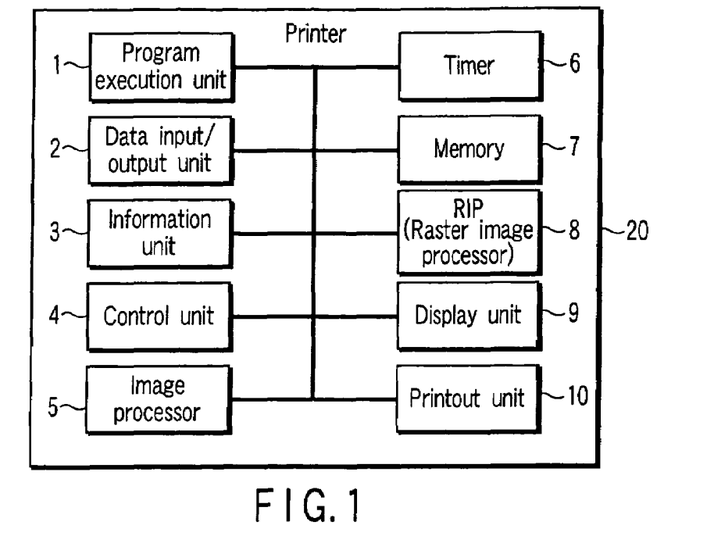
FIG. 1 is a block diagram schematically showing the configuration of a printer according to the present invention.

FIG. 1 is a block diagram schematically showing the configuration of a printer 20 according to the present invention. The printer 20 is composed of program execution unit 1, data input/output unit 2, information unit 3, operation unit 4, image processor 5, timer 6, memory 7, raster image processor (RIP) 8, display unit 9 and printout unit 10.

The program execution unit 1 reads and executes programs stored in the memory 7.

The data input/output unit 2 is an interface, which inputs data from external devices such as personal computer, and outputs data.

The information unit 3 supplies an information message to user.

The operation unit 4 is used when user operates the printer 20.

The image processor 5 converts a print image generated by the RIP 8 into an image suited to print, and makes correction to output the image more beautiful.

The timer 6 is clock means.

The memory 7 is able to read and write program, supplied data and temporarily stored data at a unit of block.

The RIP 8 interprets a supplied page description language (PDL) to form a print image.

The display unit 9 displays an operating situation and a state of the printer 20.

The printout unit 10 prints a print image on paper.

Figure 2:
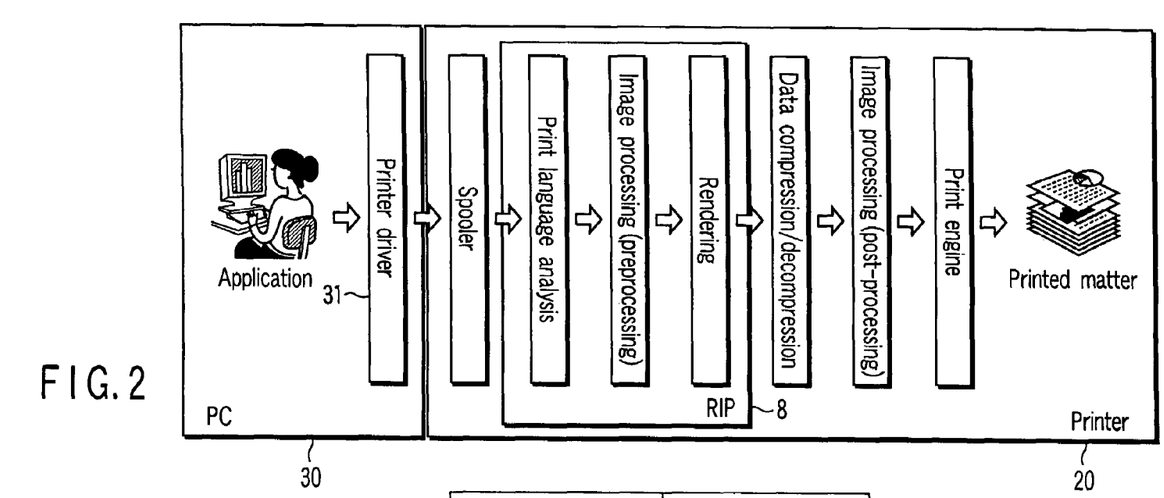
FIG. 2 is a view to explain the printing operation of the printer.

FIG. 2 is a view to explain the printing operation of the printer 20.

For example, PLD data is generated from an application operating on a personal computer (PC) 30 using a printer driver 31, and then, the PDL data is supplied to the printer 20 via LAN.

In the printer 20, the PDL data supplied via the data input/output init 2 is temporarily stored in the memory 7, and further, read into the RIP 8. In the RIP 8, the read PDL data is interpreted in a print language analysis step, and then, subjected to scaling and color conversion in an image processing (preprocessing) step. Then, print image data is generated in a rendering step.

The generated print image data is compressed in a data compression/depression step (image processor 5), and thereafter, stored in the memory 7. The compressed print image data stored in the memory 7 is read, and thereafter, decompressed in the data compression/depression step (image processor 5). The compressed print image data is subjected to tone and half-tone corrections in an image processing (post-processing) step (image processor 5), and then, supplied to a print engine (printout unit 10). The print engine (printout unit 10) prints the supplied print image data on paper to generate a printed matter.

In the foregoing printing operation process, there is the case where application and printer driver do not generate suitable PDL. For this reason, an error sheet is printed or illegal character occurs although it is a rare case.

Figure 3:
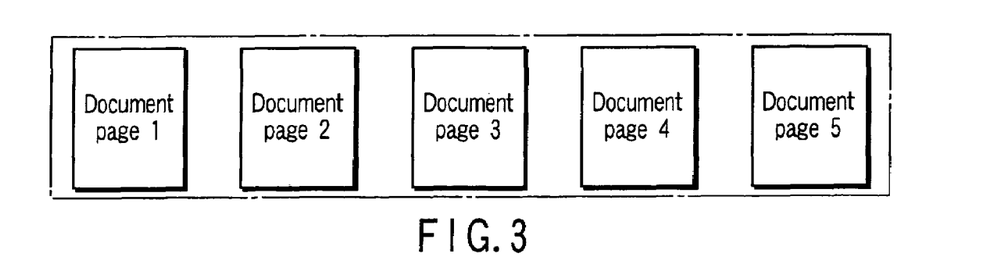
FIG. 3 is a view showing a printout example when normal print is expected.

FIG. 3 is a view showing a printout example when normal print is expected.

Figure 4:
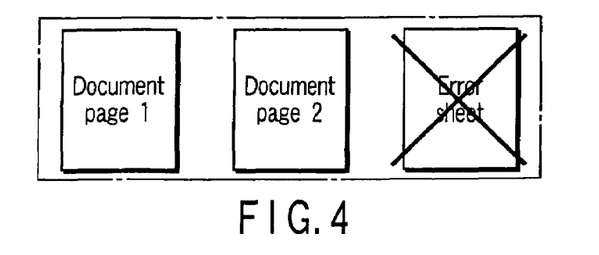
FIG. 4 is a view showing a printout example when an error occurs.

FIG. 4 is a view showing a printout example when an error occurs. This error occurs resulting from the following cases. One is the case where bug exists in PDL data generated by application or printer driver; for this reason, the PDL is described in error. Another is the case where intermediate data created temporarily in the memory is complicated; for this reason, the storage capacity is short of.

Figure 5:
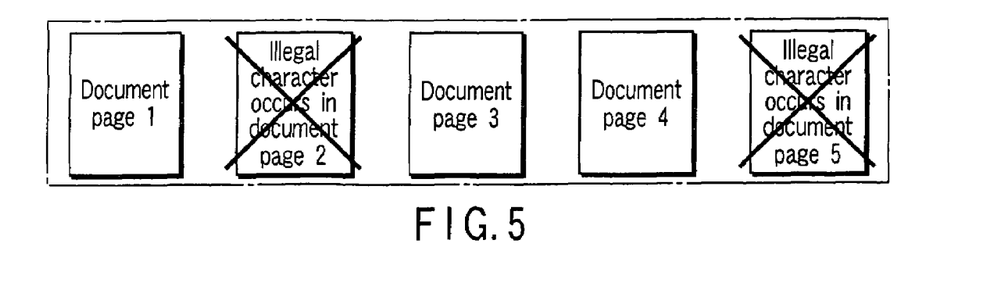
FIG. 5 is a view showing a printout example when illegal character occurs.

FIG. 5 is a view showing a printout example when illegal character occurs. According to the illegal character, if no font designated from the application exists in the printer 20, characters are printed using another font, and the printer operates as if a normal print is made. However, kanji portion is converted into alphanumeric characters, and the print position is shifted.

According to the present invention, the procedures given below are taken. Specifically, the processing content of the printer 20 is automatically changed based on the kind of errors detected in the print language analysis step of the RIP 8 to prevent wasteful print. Moreover, error information is given to user so that user selects a necessary page of a print job, which is not printed, and prints it. By doing so, user's availability is improved.

The print language analysis step of the RIP 8 has an error detection function.

The RIP detects an error, and thereafter, the program execution unit 1 determines the kind of the error to automatically change the processing content of a print job.

Figure 6:
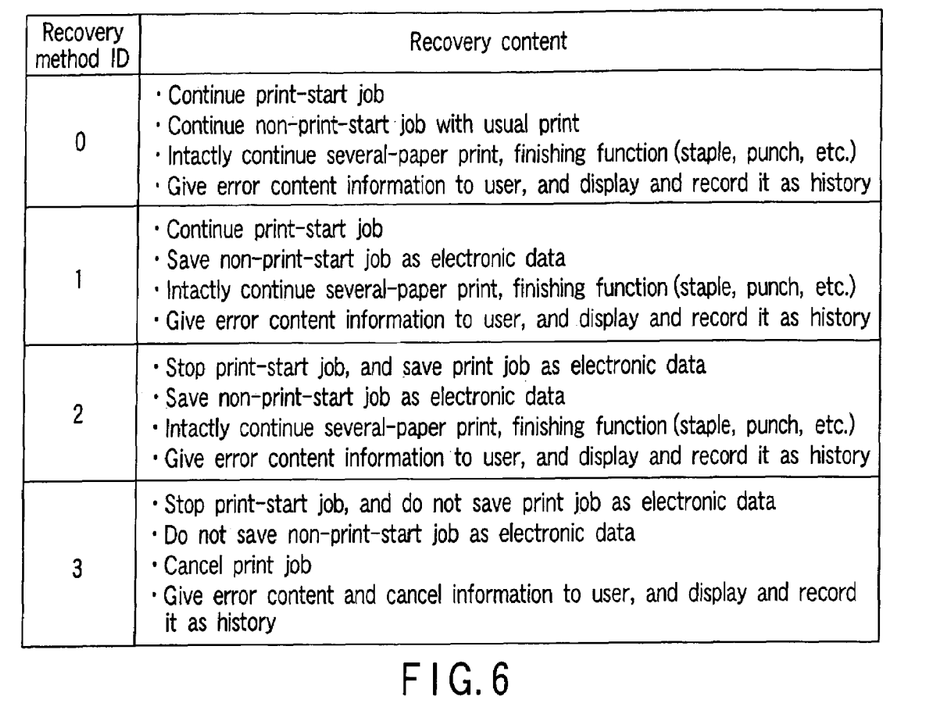
FIG. 6 is a view to explain an error recovery management table.

FIG. 6 shows an error recovery content management table. In the table, an error is previously classified, and recovery contents with respect to the error are defined. The table is prepared in the memory 7. According to the table, recovery method ID is classified into four, that is, "0", "1", "2" and "3".

Figure 7:
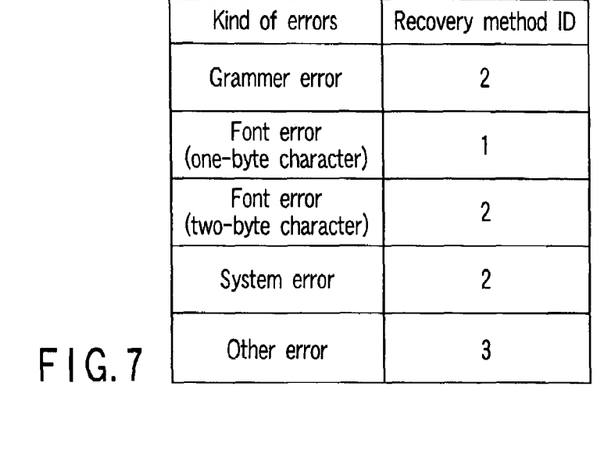
FIG. 7 is a view to explain an error recovery method setting table.

FIG. 7 shows an error recovery method setting table. The table is also prepared in the memory 7. For example, if the kind of error is a syntax error, the recovery method ID "2" is selected to execute the recovery content of the recovery method ID "2" the error recovery content management table shown in FIG. 6. Specifically, if the error is "syntax error", a print job is automatically changed to execute the following control. That is, printing is immediately stopped to prevent paper from being wastefully spent, and to give the error information to user. Then, the print job is held as electronic data, and user selects pages as the need arises.

Moreover, if the error is "font error (two-byte character)" and "system error", the same control as above is executed according to the error recovery method setting table shown in FIG. 7. If the error is "font error (one-byte character)", the font used in place of the one-byte character is alphanumeric character; therefore, printing is not stopped. However, if several paper printing is set, the control is cancelled, and thereafter, only one page is printed, and the job setting is changed.

Figure 8:
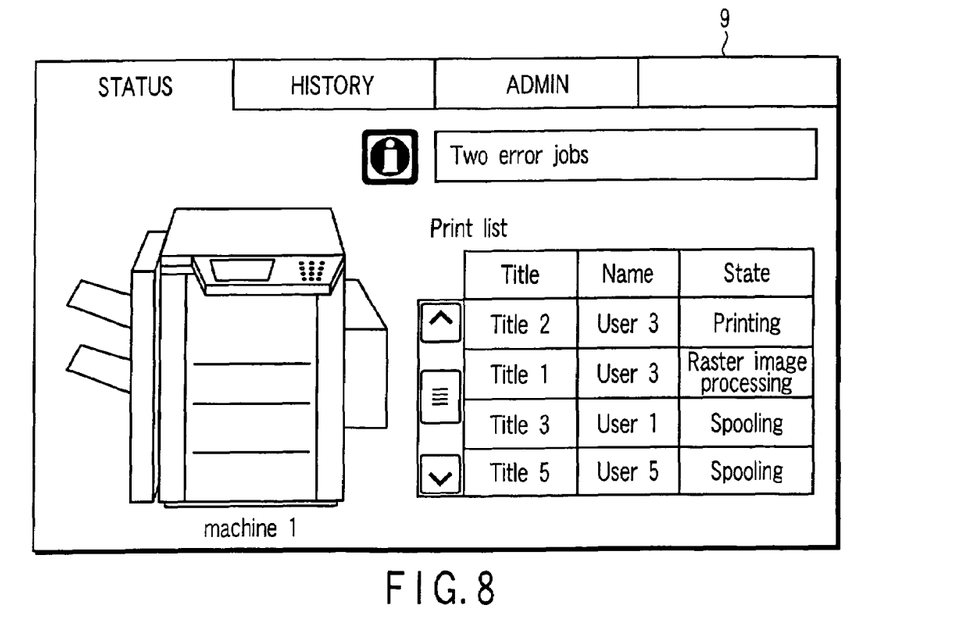
FIG. 8 is a view showing a screen of a display unit displaying the status when a print job is changed.

FIG. 8 shows a screen displayed on the display unit 9 displaying the status when a print job is changed.

Figure 9:
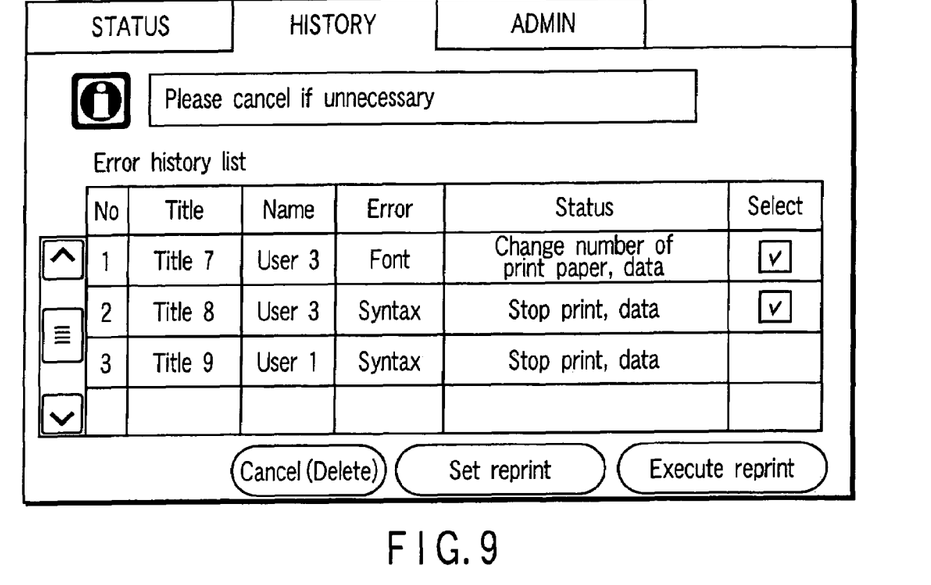
FIG. 9 is a view showing a screen of a display unit displaying the history when a print job is changed.

FIG. 9 shows a screen displayed on the display unit 9 displaying the history when a print job is changed.

Figure 10:
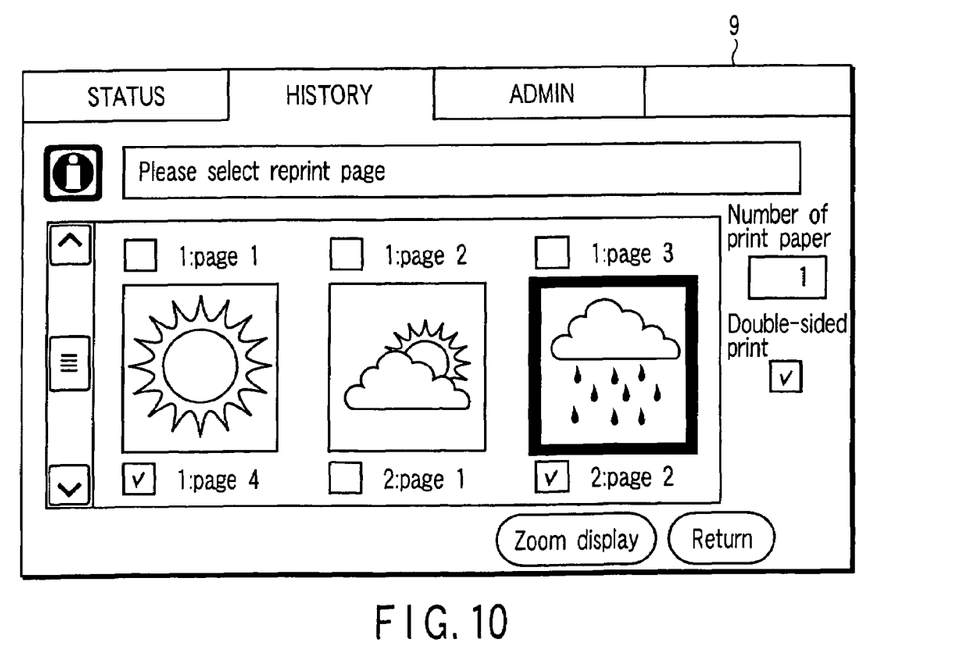
FIG. 10 is a view showing a select display screen displayed in reprinting.

FIG. 10 shows a select screen displayed on the display unit 9 when reprint is made.

The automatically changed print job is managed in its history so that user readily grasps the change content, and reprint is possible as the need arises.

The printing operation of the printer having the foregoing configuration will be explained below with reference to each flowchart shown in FIG. 11 to FIG. 19.

Figure 11:
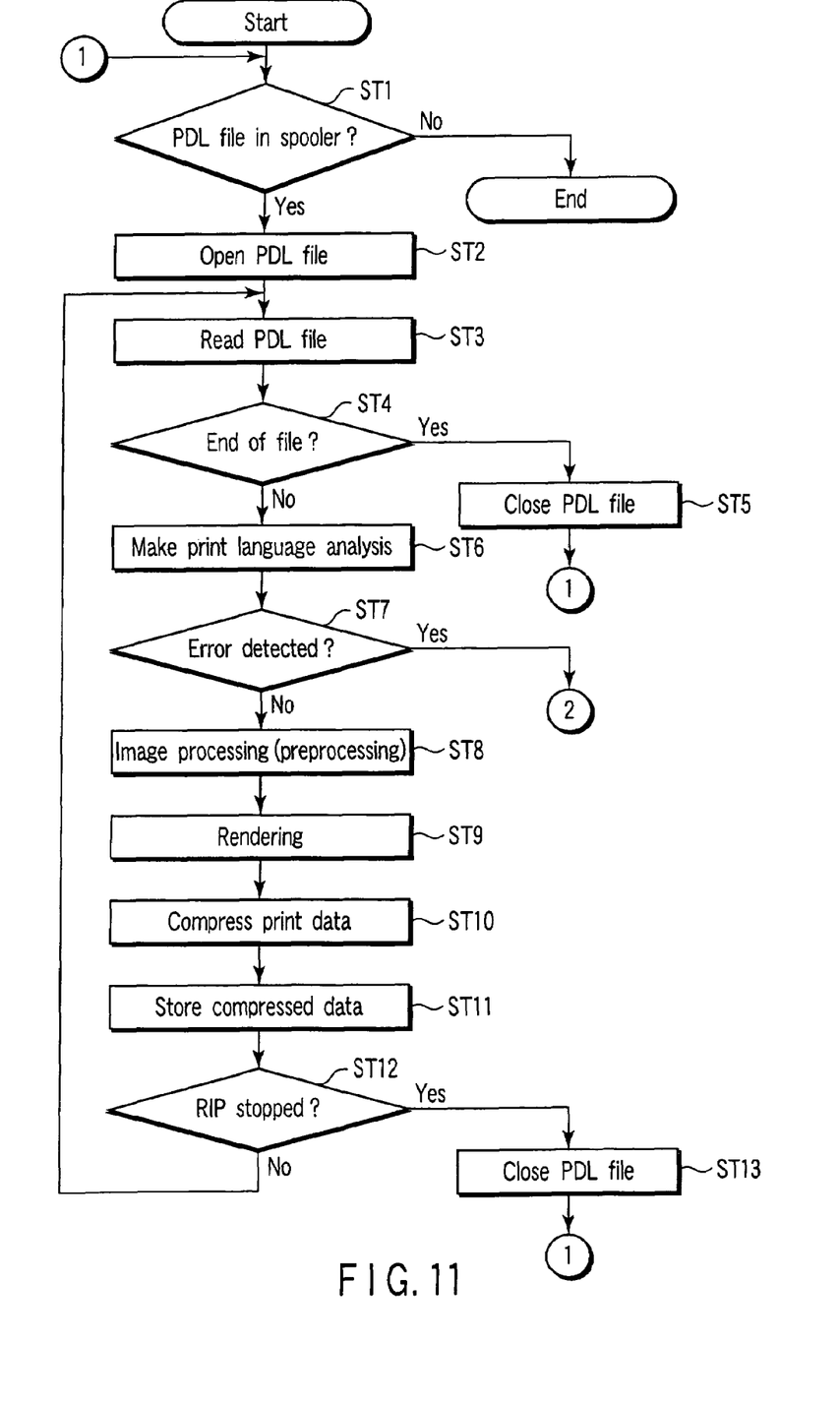
FIG. 11 is a flowchart to explain printing (preprocessing)

Printing (preprocessing) will be explained below with reference to the flowchart of FIG. 11.

The program execution unit 1 of the printer 20 checks whether or not a PDL file supplied from the PC 30 exists in a spooler (ST 1). If the PDL file exists in the spooler, the program execution unit 1 starts printing.

The program execution unit 1 opens the PDL file (ST 2), and then, reads PDL data (ST 3).

The RIP 8 makes print language analysis of the read data (ST 6), and if an error is detected therein, error recovery is carried out (ST 7).

If there is no error, the RIP 8 carries out image processing (preprocessing) (ST 8) and rendering (ST 9).

The image processor 5 compresses print data (ST 10).

The program execution unit 1 stores compressed data in the memory 7 (ST 11). If an instruction to stop raster image processing (RIP) from error recovery is given, the program execution unit 1 stops the raster image processing (RIP) (ST 12). If the instruction is not given, the program execution unit 1 repeats the raster image processing (RIP) until the PDL file ends (ST 3 to ST 12).

Figure 12:
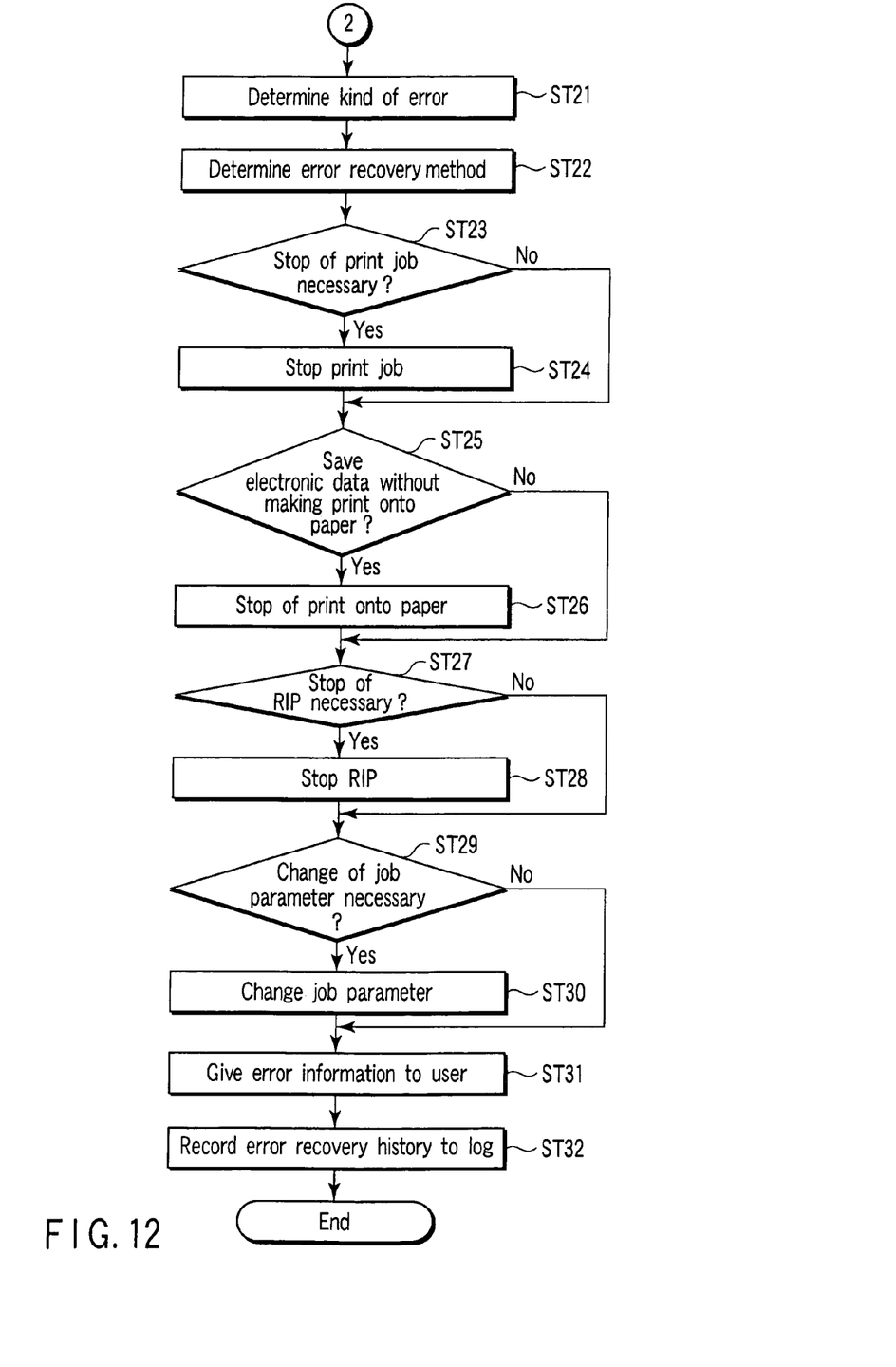
FIG. 12 is a flowchart to explain the procedure taken to errors.

The error recovery will be explained below with reference to the flowchart of FIG. 12.

When detecting an error in the print language analysis (ST 7), the program execution unit 1 determines a kind of error and an error recovery method referring to the following two tables, which are stored in the memory 7 (ST 21, ST 22). One is an error recovery content management table, and another is an error recovery method setting table.

The program execution unit 1 determines the following processings according to the content of the determined error recovery method, and then, executes necessary processing. The foregoing processings are as follows:

Stop of print job (ST 23, ST 24);
Stop of print on paper (ST 25, ST 26);
Stop of RIP (ST 27, ST 28); and Change of job parameter to specify the number of print paper and finishing (ST 29, ST 30).

Thereafter, the program execution unit 1 gives error information to the user via the information unit 3 (ST 31), and then, records an error recovery history in a log (memory 7) (ST 32).

Figure 13:
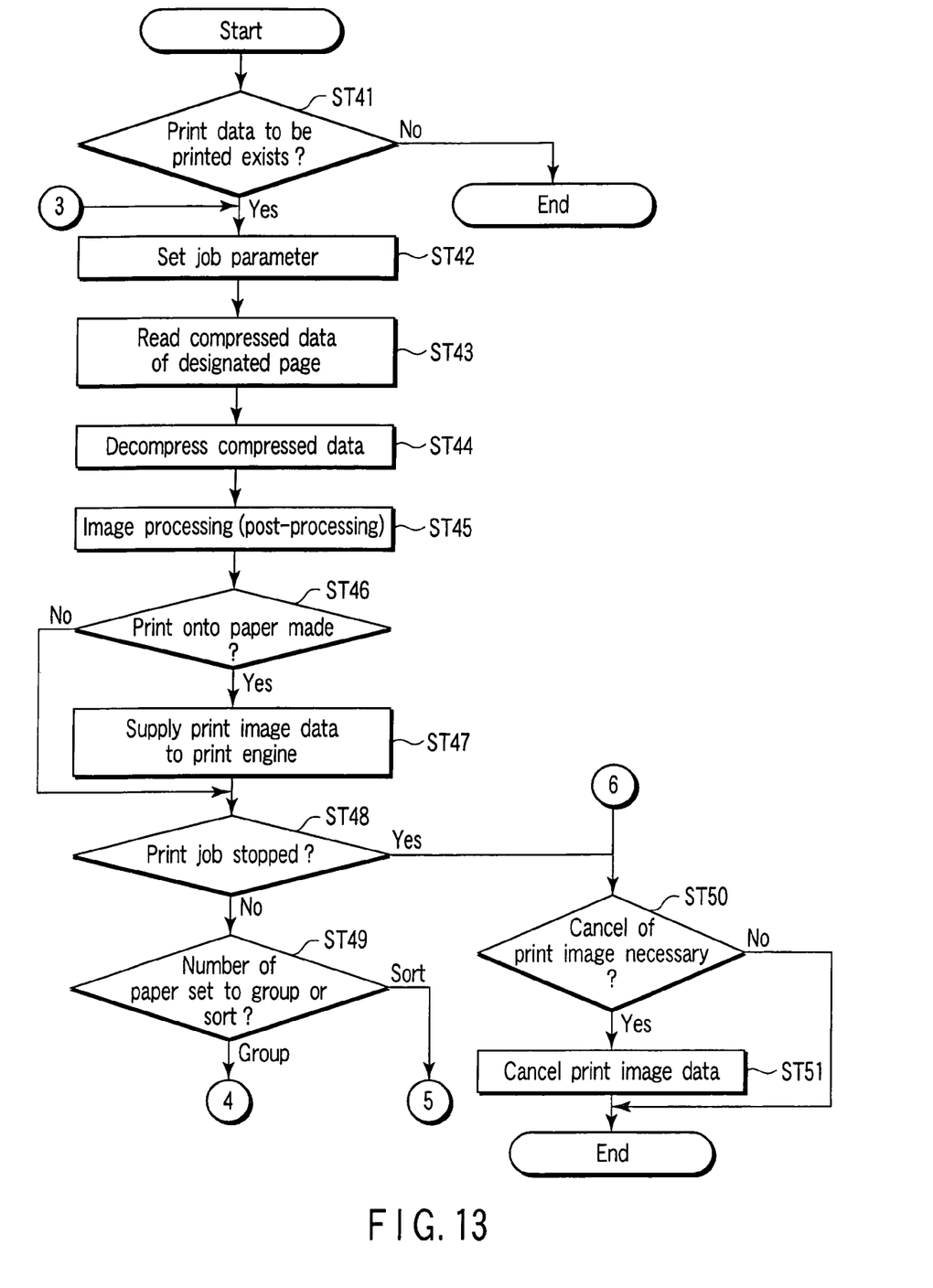
FIG. 13 is a flowchart to explain printing (post-processing)
Figure 14:
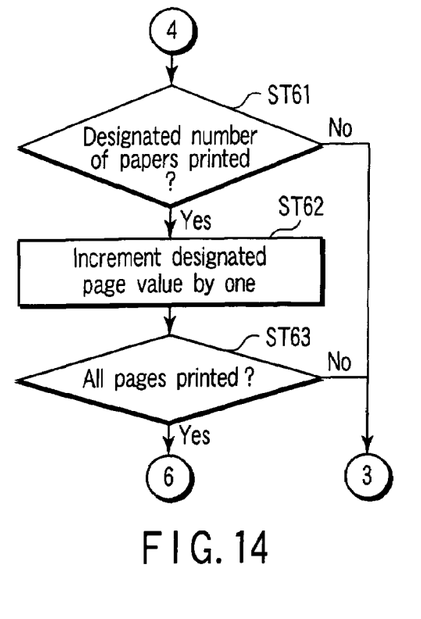
FIG. 14 is a flowchart to explain printing (post-processing)
Figure 15:
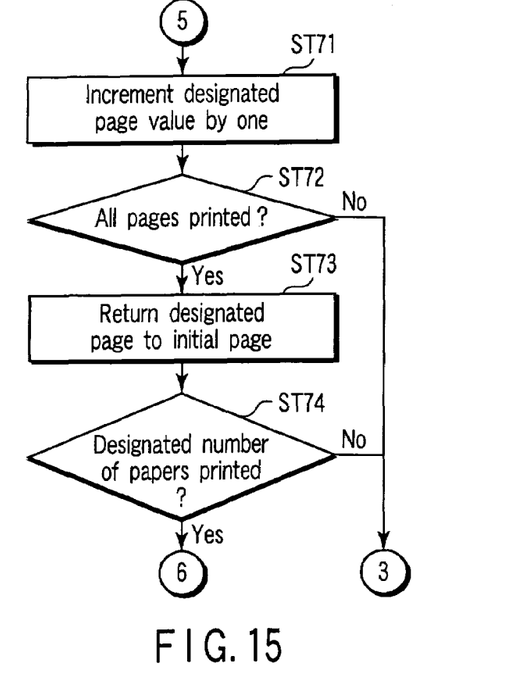
FIG. 15 is a flowchart to explain printing (post-processing)

Printing (post-processing) will be explained below with reference to each flowchart of FIG. 13 to FIG. 15.

If there exists compressed data of a print image saved in the memory by printing (preprocessing) (ST 41), the program execution unit 1 sets job parameter (ST 42).

The program execution unit 1 reads compressed data of designated pages (ST 43), and decompresses it via the image processor 5 to obtain the initial print image while to making image processing (post-processing) (ST 44, ST 45).

If print onto paper is made (ST 46), the program execution unit 1 supplies print image data to the printout unit (print engine) 10 (ST 47).

If print onto several papers is made (ST 49), processing is divided into group processing (ST 61, 62, 63) and sort processing (ST 71, 72, 73, 74). Then, each processing branches to print the number of necessary papers. According to the group processing, the same pages are collectively printed according to setup. According to the sort processing, the number of necessary papers is printed at a unit using a range from the beginning to the end as one set.

In this case, if an error occurs in the printing (preprocessing), the following processings are executed as the need arises. The processings are stop of print job (ST 48), print onto paper (ST 46) and cancel (delete) of print image data (ST 50, 51).

Finally, the error recovery procedure will be explained below with reference to each flowchart of FIG. 16 to FIG. 19.

Figure 16:
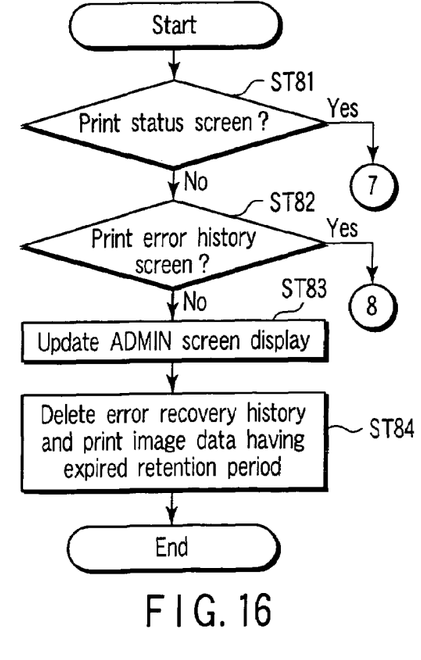
FIG. 16 is a flowchart to explain the error recovery procedure.

If an error occurs in the printing (preprocessing), print job is processed based on the content defined in the foregoing error recovery content management table and error recovery method setting table.

In this case, since print image data is already saved, user confirms this to reprint the saved print image data if he has necessary pages. Moreover, user periodically checks a screen to delete error recovery history and print image data having an expired retention period using the timer 6.

In this case, if the screen is a print status screen (ST 81), the program execution unit 1 searches an error recovery history log from the memory 7 (ST 91). Then, the program execution unit 1 counts the number of errors, which is registered as an error recovery and has no error recovery made by user (ST 92). Thereafter, the program execution unit 1 sets the number of remaining error recovery (ST 93). The program execution unit 1 updates the display of the print status screen on the display unit 9 (ST 94).

Figure 17:
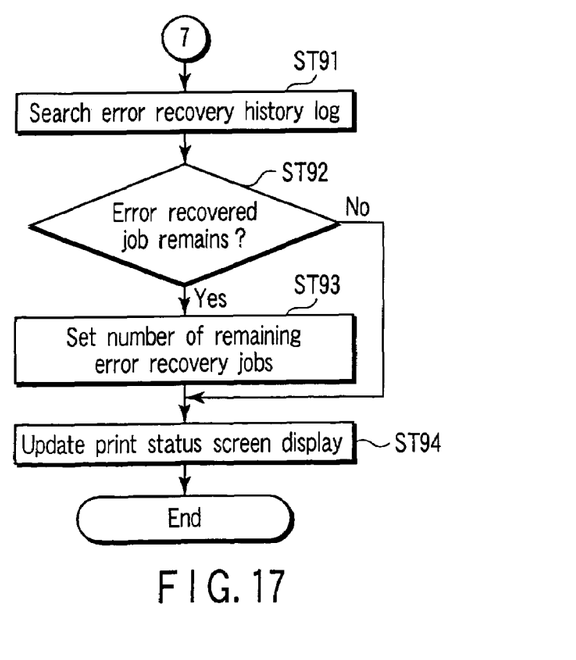
FIG. 17 is a flowchart to explain the error recovery procedure.

If the screen is a print status screen (ST 82), the program execution unit 1 reads the error recovery history log from the memory 7 (ST 101). Then, when the user presses a scroll button of an error history list (ST 102), the program execution unit 1 scrolls the error recovery history (ST 103). The program execution unit 1 sets non-processing error recovery on the history list (ST 104), and then, updates the display screen of the display unit 9 (ST 105).

Figure 18:
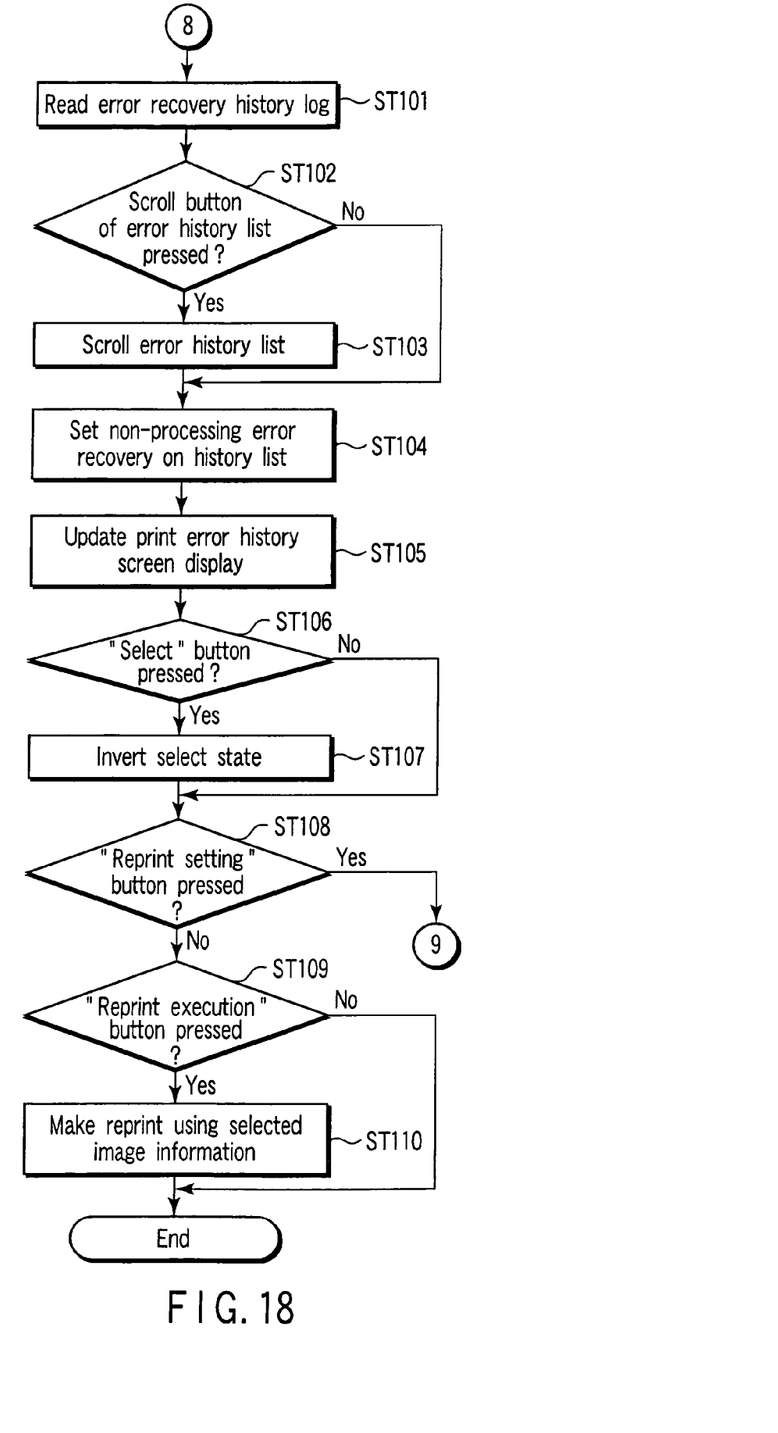
FIG. 18 is a flowchart to explain the error recovery procedure.

If a "select" button is pressed (ST 106), the program execution unit 1 inverts a check state of a check box (ST 107). For example, if the check state is a selected state, the unit 1 changes it to a non-select state; on the other hand, if the check state is a non-select state, the unit 1 changes it to a selected state If a "reprint setting" button is pressed (ST 108), the program execution unit 1 changes the display screen of the display unit 9 into a print image select screen. When a scroll button of an image select list is pressed (ST 111), the program execution unit 1 scrolls the image select list (ST 112). Then, the program execution unit 1 creates thumbnail images from saved compressed print image data (ST 113), and then, updates the display unit of the print image select screen (ST 114).

When an image is pressed (ST 115), the program execution unit 1 inverts a select state of the pressed image (ST 116). When a "zoom" button is pressed, the program execution unit 1 makes a zoom display in the display unit 9 (ST 118). In the display, a popup window is displayed to confirm the zoomed image.

Figure 19:
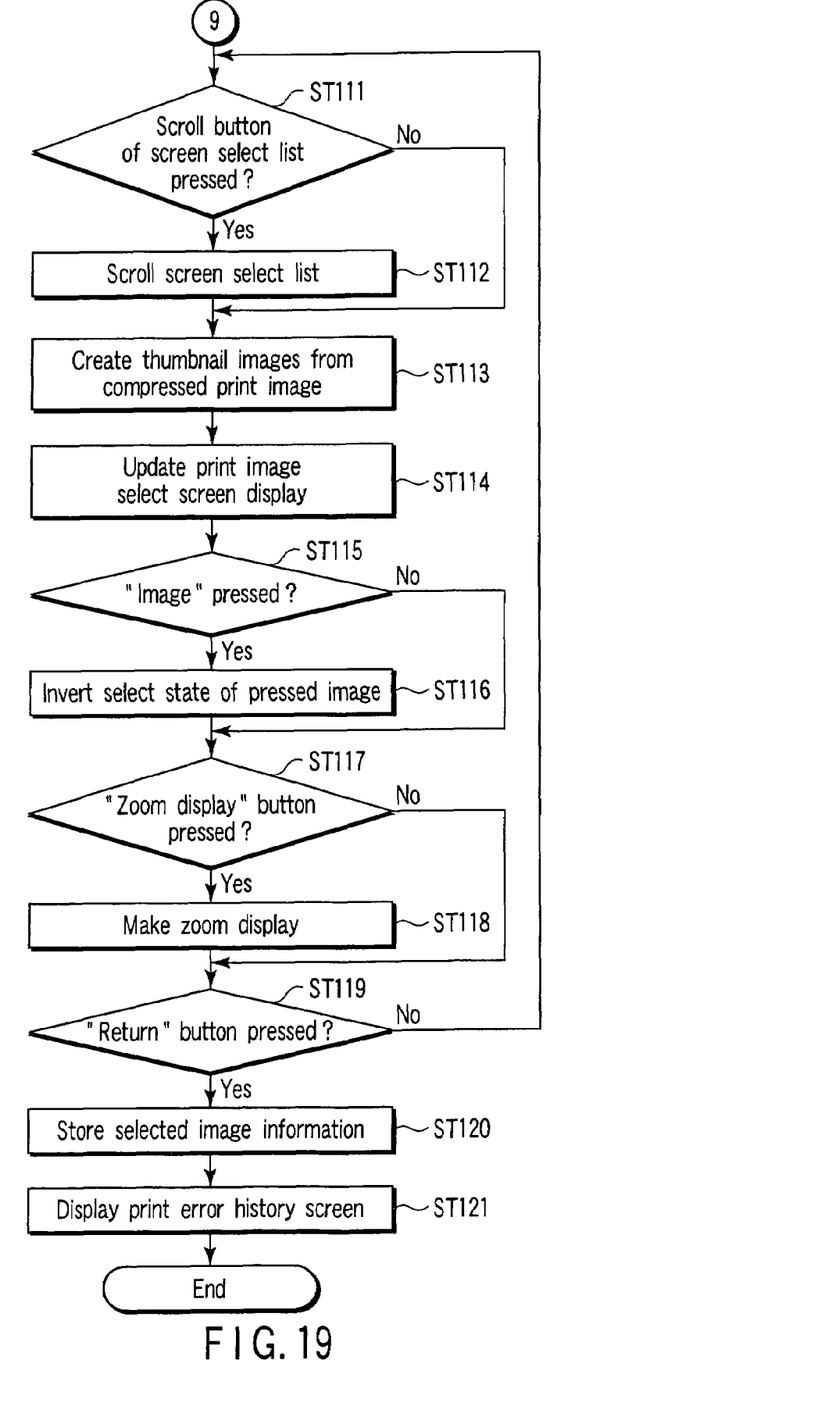
FIG. 19 is a flowchart to explain the error recovery procedure.

When a "return" button is pressed (ST 119), the program execution unit 1 stores the selected image information in the memory 7 (ST 120), and then, displays a print error history screen on the display unit 9 (ST 121).

When a "reprint execution" button is pressed on the print error history screen (ST 109), the program execution unit 1 executes reprint using the selected print image (ST 110).

According to the embodiment of the present invention, it is possible to prevent wasteful print output when errors such as PDL syntax error, illegal character and a shortage of system resource occur. By doing so, cost and wastes are reduced, and correctly output data only is selected and printed; therefore, user's availability is improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printer comprising:
   an input unit configured to input data for printing;
   an analysis unit configured to analyze the data input by the input unit;
   a print engine configured to execute a print job for the data analyzed by the analysis unit; and
   a controller configured to determine a kind of an error upon detection of the error by the analysis unit, select one of a plurality of recovery methods held in a table memory for the kind of the error, and control the print engine to change a content of the print job according to the selected recovery method.

2. The printer according to claim 1, wherein the data input by the input unit is in a page description language.

3. The printer according to claim 1, wherein the analysis unit is a raster image processor (RIP) which processes the input data to generate print image data for the print job.

4. The printer according to claim 3, wherein the content changed by the controller includes a combination selected from stop of print job, stop of print on paper, stop of RIP, change of number of paper, and change of finishing that includes stapling and punching.

5. The printer according to claim 3, wherein the controller is configured to save the print image data upon detection of the error, and execute control to display, edit and reprint the saved print image data.

6. The printer according to claim 1, wherein the kind of an error is selected from at least two of a syntax error, illegal character of one-byte, illegal character of two-byte, system error and other error.

7. The printer according to claim 1, wherein the controller displays information about the content of the print job changed to cope with the kind of the error.

8. The printer according to claim 1, wherein the table memory includes an error recovery content management table that classifies the error into different kinds, and an error recovery method setting table that defines recovery methods for the kinds of the error.

9. A printing method for a printer comprising an input unit configured to input data for printing, an analysis unit configured to analyze the data input by the input unit, and a print engine configured to execute a print job for the data analyzed by the analysis unit, the method comprising:
   determining a kind of error upon detection of the error by the analysis unit;
   selecting one of a plurality of recovery methods held in a table memory for the kind of the error; and
   controlling the print engine to change a content of the print job according to the selected recovery method.

10. The printing method according to claim 9, wherein the data input by the input unit is in a page description language.

11. The printing method according to claim 9, wherein the analysis unit is a raster image processor (RIP) which processes the input data to generate print image data for the print job.

12. The printing method according to claim 11, wherein the changed content includes a combination selected from stop of print job, stop of print on paper, stop of RIP, change of number of paper, change of finishing that includes stapling and punching.

13. The printing method according to claim 11, wherein the printer image data is saved upon detection of the error, and control is executed to display, edit and reprint the saved print image data.

14. The printing method according to claim 9, wherein the kind of an error is selected from at least two of a syntax error, illegal character of one-byte, illegal character of two-byte, system error and other error.

15. The printing method according to claim 9, wherein information about the content of the print job changed to cope with the kind of the error is displayed.

16. The printing method according to claim 9, wherein the table memory includes an error recovery content management table that classifies the error into different kinds, and an error recovery method setting table that defines recovery methods for the kinds.

17. A printer comprising:
   an input unit configured to input data for printing;
   an analysis unit configured to analyze the data input by the input means;
   a print engine configured to execute a print job for the data analyzed by the analysis unit; and
   control means for determining a kind of an error upon detection of the error by the analysis unit, selecting one of recovery methods held in a table memory for the kind of the error, and controlling the print engine to change a content of the print job according to the selected recovery method.

* * * * *

UNITED STATES PATENT AND TRADEMARK OFFICE
CERTIFICATE OF CORRECTION

PATENT NO.       : 7,656,548 B2                          Page 1 of 1
APPLICATION NO.  : 11/223041
DATED            : February 2, 2010
INVENTOR(S)      : Takahiro Hagiwara It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1178 days.

Signed and Sealed this

Thirtieth Day of November, 2010

David J. Kappos
*Director of the United States Patent and Trademark Office*